United States Patent
Balaji et al.

(10) Patent No.: US 7,277,857 B1
(45) Date of Patent: Oct. 2, 2007

(54) METHOD AND SYSTEM FOR FACILITATING RESTORATION OF A VOICE COMMAND SESSION WITH A USER AFTER A SYSTEM DISCONNECT

(75) Inventors: Thenthiruperai S. Balaji, Overland Park, KS (US); Kevin Packingham, Overland Park, KS (US); Elizabeth Roche, Prairie Village, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 883 days.

(21) Appl. No.: 10/400,729

(22) Filed: Mar. 27, 2003

Related U.S. Application Data (63) Continuation-in-part of application No. 09/963,776, filed on Sep. 26, 2001, now Pat. No. 7,050,976.

(51) Int. Cl.
*G10L 11/00* (2006.01)
*H04M 11/00* (2006.01)

(52) U.S. Cl. ..................... 704/270; 379/88.18

(58) Field of Classification Search .................... None
See application file for complete search history.

(56) References Cited

U.S. PATENT DOCUMENTS

| | | | |
|---|---|---|---|
| 5,297,183 A | 3/1994 | Bareis et al. | |
| 5,659,597 A | 8/1997 | Bareis et al. | |
| 5,754,736 A | 5/1998 | Aust | |
| 6,157,848 A | 12/2000 | Bareis et al. | |
| 6,775,358 B1 * | 8/2004 | Breitenbach et al. | 379/88.13 |
| 7,092,370 B2 * | 8/2006 | Jiang et al. | 370/329 |
| 2001/0044751 A1 * | 11/2001 | Pugliese et al. | 705/26 |
| 2002/0144233 A1 * | 10/2002 | Chong et al. | 717/105 |

\* cited by examiner

*Primary Examiner*—David Hudspeth
*Assistant Examiner*—Matthew J Sked (57) ABSTRACT

A method and system for facilitating restoration of a voice command session. A voice command platform may send to an application server a signal indicative of a system disconnect. In response to receiving the signal indicative of the system disconnect, the application server may send information to the voice command platform. The information may allow the voice command platform to restore the voice command session with a user. The voice command platform may send the information back to the application server when the user is reconnected back to the voice command platform. Responsively, the application server may send logic executable by the voice command platform. The voice command platform may execute the logic so as to restore the voice command session with the user.

28 Claims, 6 Drawing Sheets

GENERIC APPLICATION LOGIC

FIG. 5

USER-SPECIFIC
APPLICATION LOGIC

JOHN'S STOCK PORTFOLIO

CASH $ <u>310</u>

STOCK $ <u>1000</u>

FIG. 6

METHOD AND SYSTEM FOR FACILITATING RESTORATION OF A VOICE COMMAND SESSION WITH A USER AFTER A SYSTEM DISCONNECT

RELATED APPLICATION

This application claims priority as a continuation-in-part to patent application Ser. No. 09/963,776, entitled "Method and System for Use of Navigation History in a Voice Command Platform" listing Kevin Packingham as an inventor, filed Sep. 26, 2001 now U.S. Pat. No. 7,050,976. The entirety of this application is hereby incorporated by reference.

BACKGROUND

1. Field of the Invention

The present invention relates to functions of a telecommunication network, and more particularly, to a method and system for facilitating restoration of a voice command session with a user after a system disconnect.

2. Description of Related Art

A voice command platform provides an interface between speech communication with a user and voice command applications. Generally, a person can call the voice command platform and speak commands to the voice command platform. The voice command platform may detect certain commands spoken by the user and responsively provide responses to the person based on the commands spoken.

The voice command platform is communicatively coupled to a voice command application server ("application server"). The voice command application server may be an entity physically separate from the voice command platform or an entity integrated into the voice command platform. The application server stores and/or generates logic of a voice command application. The logic defines prompts to be spoken to a user and acceptable responses to be spoken by the user, in accordance with the voice command applications. The logic is executable by the voice command platform so as to allow the voice command platform to "speak" with the user.

For instance, a person may call the voice command platform and the voice command platform may speak to the user, "Hello. Would you like to hear a weather forecast, sports score, or stock quote?" In response, the person may state to the voice command platform, "weather forecast." The voice command platform may detect the person's response and signal the application server to load a weather forecasting application. Then, the application server may send, to the voice command platform, logic of the weather forecasting application. The voice command platform may execute the logic, causing the voice command platform to speak another speech prompt to the person, such as "Would you like to hear today's weather or an extended forecast?" The person may then respond, and the voice command platform may further execute the logic sent to the voice command platform or signal the application server to send additional logic to the voice command platform.

Therefore, the voice command platform and the application server, collectively, should be able to (i) receive and recognize speech spoken by a user; and (ii) provide speech to a user. The voice command platform and the application server can achieve these functions in various ways.

On an incoming side, for instance, the voice command platform may include an analog-to-digital (A-D) converter. The A-D converter converts an analog speech signal from a user into a digitized incoming speech signal. The voice command platform may also include a speech recognition (SR) engine. The SR engine will typically be a software module which functions to analyze the digitized incoming speech signal and to identify words in the speech.

As noted above, the logic of the voice command application defines what responses a user can speak in response to a prompt. The responses that a user can speak in response to a prompt may take the form of acceptable "grammars." The application server will send the logic to the voice command platform. In turn, the voice command platform will execute the logic so that the SR engine can identify one of the possible spoken responses defined by the acceptable grammars.

The SR engine will typically include or have access to a dictionary database of "phonemes" (small units of speech that distinguish one utterance from another). The SR engine will analyze a waveform represented by an incoming digitized speech signal and, based on the dictionary database, will determine whether the waveform represents particular grammars defined by the logic. For instance, if the logic sent by the application server indicates that the user should respond to a prompt with the grammars "sales", "service", or "operator", then the SR engine may identify a sequence of one or more phonemes that make up each of these grammars, respectively. The SR engine may then analyze the waveform of the incoming digitized speech signal in search of a waveform that represents one of those sequences of phonemes. If the SR engine finds a match, then the voice command platform further executes the logic already sent by the application server to the voice command platform. Alternatively, the voice command platform may signal the application server to send additional logic, based on the response spoken by the user.

Additionally, the SR engine or an ancillary module in the voice command platform will typically function to detect dual-tone multi-frequency (DTMF) tones dialed by a user. For instance, the logic of the voice command application might define a DTMF grammar as an acceptable response by a user. The voice command platform may execute the logic of the voice command platform upon the SR engine or the ancillary module detecting the DTMF grammar.

On an outgoing side, the voice command platform may include a text-to-speech (TTS) engine. The TTS may function to convert text into outgoing digitized speech signals. In turn, the voice command platform may include a digital-to-analog (D-A) converter for converting the outgoing digitized speech signals into audible voice to be communicated to the user.

Thus, the application server may specify to the voice command platform the logic in the form of text that represents the audible voice to be spoken to a user. In turn, the voice command platform may execute the logic by passing the text to the TTS engine. The TTS engine will then convert the text to the outgoing digitized speech signal. The voice command platform converts the signal into the audible voice to be spoken to the user.

Also on the outgoing side, a voice command platform may include a set of stored voice prompts, in the form of digitized audio files (e.g., *.wav files for instance). These stored voice prompts would often be common prompts, such as "Hello", "Ready", "Please select from the following options", or the like. Each stored voice prompt might have an associated label (e.g., a filename under which the prompt is stored). The application server might send logic specifying that the voice command platform should speak a particular prompt to a user, identified by the associated label.

The voice command platform may responsively retrieve the audio file, convert the audio file into an analog waveform, and send the analog waveform to the user.

The logic that the application server serves to the voice command platform may reside permanently on the application server. Alternatively, the voice command application may be loaded dynamically into the application server. For instance, the application server can be communicatively coupled to a storage medium where various voice command applications reside. When a user calls the voice command platform, the voice command platform can signal the application server to load a voice command application from the storage medium and send logic of the voice command application to the voice command platform. Further, a response from the user may cause the voice command platform to signal the application server to load another voice command application and send logic of the other voice command application to the voice command platform. In this way, a user can navigate through a series of voice command applications and menus in the various voice command applications, during a given voice command session.

The voice command application can be written or rendered in any of a variety of computer languages. One such language is VoiceXML (or simply "VXML"). VXML is a tag-based language similar to HTML that underlies most Internet web pages. Other analogous languages, such as SpeechML, VoxML, or SALT, for instance, are available as well.

An application developer can write a voice command application in VXML, Speech ML, VoxML, or SALT. Alternatively, an application developer can write a voice command application in a programming language such as Java, C, C++, etc. The application server may serve to the voice command platform the logic of the voice command application in the programming language written by the application developer. In turn, the voice command platform or some intermediate entity could transcode the logic from the programming language written by the application developer into VXML, Speech ML, VoxML, or SALT.

In at least VXML, a document may encapsulate the logic of the voice command application. The application server may serve the logic of the voice command application by serving documents that encapsulate the logic. Additionally, the documents have navigation points. The navigation points allow the voice command platform and the application server to identify documents within the voice command applications and/or menus items within the voice command applications. Each navigation point may have a respective identifier or label. For example, a voice command application can define a number of successive menus through which a user can browse, and each menu might have a respective label by which it can be referenced. The voice command platform and the application server can use these labels to move from document to document or from menu item to menu item, just as hyperlinks operate to cause a browser to move from one web page (or component of one web page) to another.

For instance, the identifier or label of the navigation point may take the form of a Universal Resource Identifier (URI). The voice command platform and the application server may use the URI to identify documents of a voice command application. For instance, a document may indicate that, if a user speaks a particular grammar, the platform should execute a particular document from a designated URI, but that, if the user speaks another grammar, then the platform should execute another document from another designated URI. If the document is not present on the voice command platform, then the voice command platform may signal the application server to send the document to the voice command platform. Responsively, the application server may locate the document at the designed URI and send the document to the voice command platform.

An example of a VXML application is a weather reporting application. The weather reporting application may have a document that includes a tag defining a welcome message and prompting a user to indicate a city or zip code. The document may further set forth a bundle of grammars that are possible city names and corresponding zip codes that a user can speak in response to the prompt.

When the application server sends this document to the voice command platform, the voice command platform may execute the logic defined by the document. The voice command platform may send a welcome message/prompt to the TTS engine so as to have the message/prompt spoken to the user. In turn, when the user speaks a response, the SR engine may identify the response as one of the acceptable grammars.

The document might next prompt the user to indicate whether he would like to hear today's weather or an extended forecast, and the user would again speak a response. In turn, the document might indicate that, if the user selects "today's weather," the voice command platform should signal the application server to send a document identified by a designated URI. If the user selects "extended forecast," however, the voice command platform should signal the application server to send a different document identified by another designated URI. The application server may retrieve the document at the designed URI, send another document to the voice command platform, and the voice command platform may execute the logic of the document.

SUMMARY

A user typically calls up a voice command platform through a telecommunication network. As a result, there is a possibility that the user can be disconnected from the telecommunication network during a voice command session. The user may be disconnected, for example, because of a coverage drop, signal fade, hang-up, in-bound call, out-dialed call, or error. Eventually, the user will be reconnected back to the telecommunication network and to the voice command platform. At this time, there exists a need to be able to restore the voice command session with the user.

The voice command platform may be programmed to restore the voice command session 110 with the user. For instance, the voice command platform may execute logic that was served by the application server prior to the system disconnect. Assuming that the voice command platform did not delete the logic, the voice command platform may present prompts to the user and accept responses from the user, as defined by the logic served prior to the system disconnect.

The prompts presented to the user and the responses accepted from the user might restore the voice command session. The prompts presented and responses accepted, however, might not be appropriate for restoring the voice command session with the user. The prompts and responses may have been intended to be presented and accepted, respectively, prior to the system disconnect, not after the system disconnect.

In accordance with a principle aspect of the present invention, the application server may be programmed with how the voice command platform should restore the voice command session with the user, when the user is reconnected back to the voice command platform. The application server may be programmed with what prompts should be presented to the user when communication with the user is restored. Also, the application server may be programmed with what responses should be accepted from the user when communication with the user is restored. When the user is disconnected from the telecommunication network, the application server may send information to the voice command platform. The information may be indicative of logic executable by the voice command platform when communication with the user is restored. The logic may define the prompts to be spoken to the user and the acceptable responses to be received from the user when the communication with the user is restored. The voice command platform may receive and store the information in a user profile store. When the user is reconnected back to the telecommunication network, the voice command platform may send the information back to the application server. Responsively, the application server may send logic associated with the information. The voice command platform may execute the logic so as to restore the voice command session with the user. The voice command platform may present to the user the prompts defined by the logic and accept from the user the responses defined by the logic, in accordance with the programming of the application server.

Thus, in one respect, an exemplary embodiment of the present invention may take the form of a system comprising a voice command platform and an application server. The voice command platform may be arranged (i) to receive, from the application server, logic of a voice command application, (ii) to engage in a voice command session with a user pursuant to the voice command application, (iii) to detect a system disconnect during the voice command session; and (iv) to responsively send a signal indicative of the system disconnect to the application server. The application server may be arranged to send to the voice command platform, in response to the signal indicative of the system disconnect, information indicative of logic executable by the voice command platform when communication with the user is restored after the system disconnect. The voice command platform may be further arranged to send the information back to the application server, when the communication with the user is restored after the system disconnect. The information may cause the application server to send to the voice command platform the logic executable by the voice command platform, so as to restore the voice command session with the user.

In another respect, an exemplary embodiment of the present invention may take the form of a system also comprising a voice command platform and an application server. The voice command platform may be arranged to receive from the application server logic of a voice command application. The logic of the voice command application may allow the voice command platform to engage in a voice command session with a user pursuant to the voice command application. The application server may be arranged to send to the voice command platform, embedded in the logic of the voice command application, information indicative of logic executable by the voice command platform. In response to detecting the system disconnect, the voice command platform may be arranged to extract the information from the logic of the voice command application. The voice command platform may then send the information back to the application server, when the communication with the user is restored after the system disconnect. In response to receiving the information back from the voice command platform, the application server may send to the voice command platform, the logic executable by the voice command platform, so as to cause the voice command platform to restore the voice command session with the user.

In yet another respect, an exemplary embodiment of the present invention may take the form of a system still comprising a voice command platform and an application server. The voice command platform may be arranged (i) to engage in a voice command session with a user pursuant to a voice command application and (ii) to detect a system disconnect with a user during the voice command session. The application server may be arranged to send to the voice command platform logic executable by the voice command platform. The application server may send, embedded in logic of the voice command application sent prior to the system disconnect, the logic executable by the voice command platform. Alternatively, the application server may send, in response to detecting the system disconnect, the logic executable by the voice command platform. The voice command platform may be further arranged to execute the logic when the communication with the user is restored after the system disconnect. By executing the logic, the voice command platform can restore the voice command session with the user.

These as well as other aspects and advantages of the present invention will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

Figure 1:
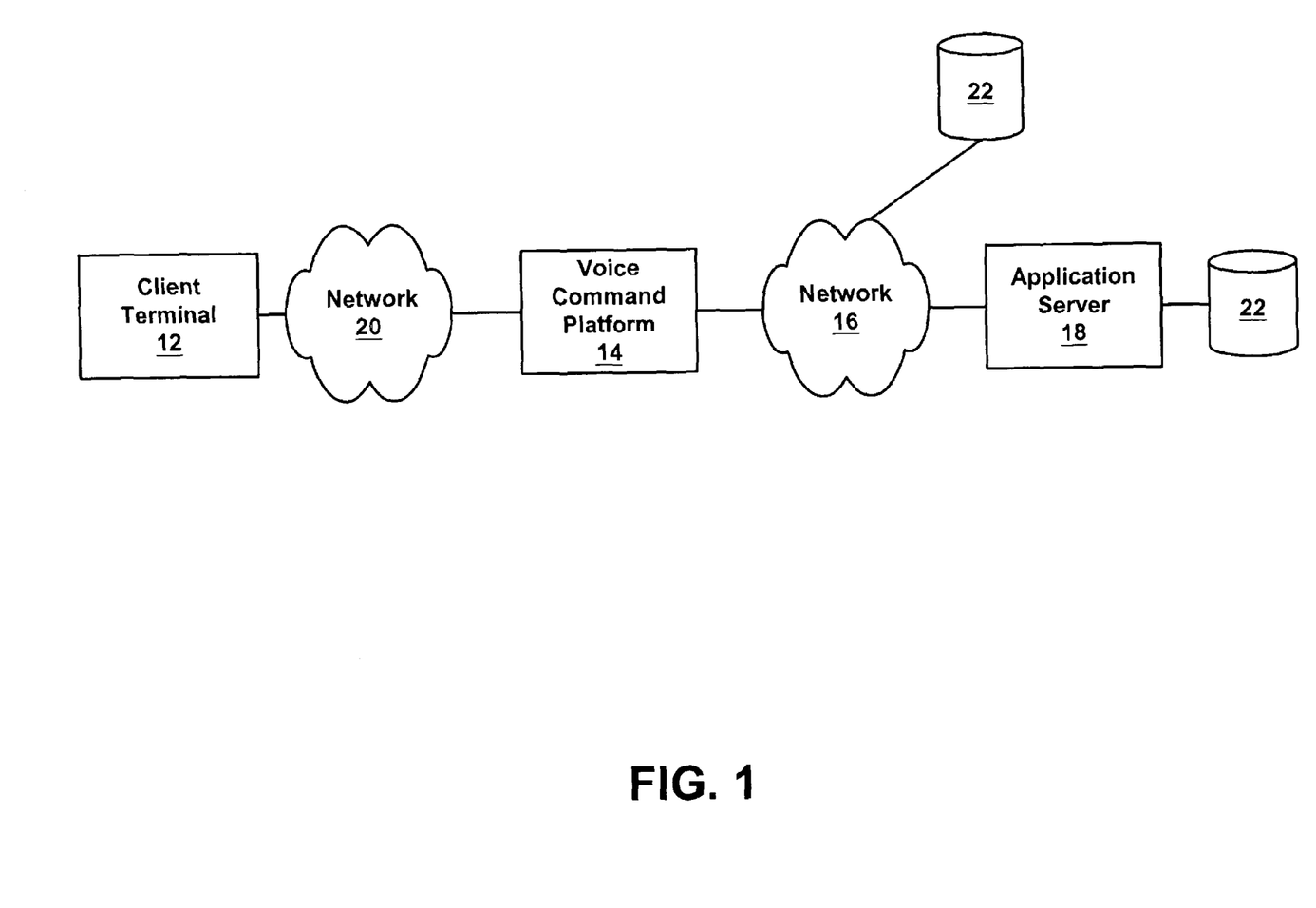
FIG. 1 is a block diagram of a network architecture in which exemplary embodiments of the present invention can be employed.

Referring to the drawings, FIG. 1 is a block diagram illustrating a network architecture in which exemplary embodiments of the present invention can be employed. It should be understood that that the network architecture described herein is set forth for purposes of example only. Those skilled in the art will appreciate that other arrangements and other elements (e.g., machines, interfaces, functions, orders and groupings of functions, etc.) can be used instead, and some elements may be omitted altogether. Further, as in most telecommunication applications, those skilled in the art will appreciate that many of the elements described herein are functional entities that may be implemented as discrete components or in conjunction with other components, and in any suitable combination and location.

As shown in FIG. 1, the network architecture may include a client terminal 12, networks 16, 20, a voice command platform 14, and an application server 18.

The client terminal 12 may be any type of device capable of exchanging voice signals or DTMF signals with a voice command platform 14. The client terminal 12 may be a wireless device such as a cellular telephone. Alternatively, the client terminal 12 may be a wired device such as a landline phone. Indeed, the client terminal 12 could take a variety of forms now or later known to those skilled in the art.

The voice command platform 14 may be a processor-based device capable of executing logic of a voice command application. The logic may be computer instructions written in VXML, SpeechML, VoxML, SALT, or some other type of computer language. The logic of the voice command application defines user prompts spoken to the users and allowed grammars to be spoken by the users, in accordance with the voice command application. By being executed by the voice command platform 14, the logic allows the voice command platform 14 to converse with a user of the client terminal 12, over the network 20, as dictated by the voice command application.

The network 20 may be a telecommunication network that carries the voice signals, in analog or digital form, between the voice command platform 14 and the client terminal 12. The network 20 may take the form of a radio access network, if, for example, the client terminal is a wireless device such as a cellular telephone. Alternatively, the network 20 may take the form of a public switched telephone network (PSTN) or Internet if, for example, the client terminal is a wired device such as a telephone. Of course, other arrangements are also possible for facilitating exchange of the voice signals between the client terminal 12 and the voice command platform 14.

The voice command platform 14 and the application server 18 may be integrated on a single platform. Alternatively, as shown by FIG. 1, the voice command platform 14 and the application server 18 may be separated by a network 16. The network 16 communicatively couples the voice command platform 14 and the voice command application server 18. The network 16 may be a local area network, a wide area network, or even the Internet. The network 16 may carry signals between the application server 18 and the voice command platform 14. The signals may define, for instance, the logic executed by the voice command platform 14. Other arrangements are also possible.

The application server 18 may be communicatively coupled to a storage medium 22. The storage medium 22 may store the logic for various voice command applications. The storage medium 22 may be directly coupled to the application server 18. Additionally or alternatively, the network 16 may communicatively couple the storage medium 22 to the application server 18. The application server 18 may retrieve the logic for a voice command application from the storage medium 22. And, as noted above, the application server 18 may send the logic to the voice command platform 14 for execution by the voice command platform.

Figure 2:
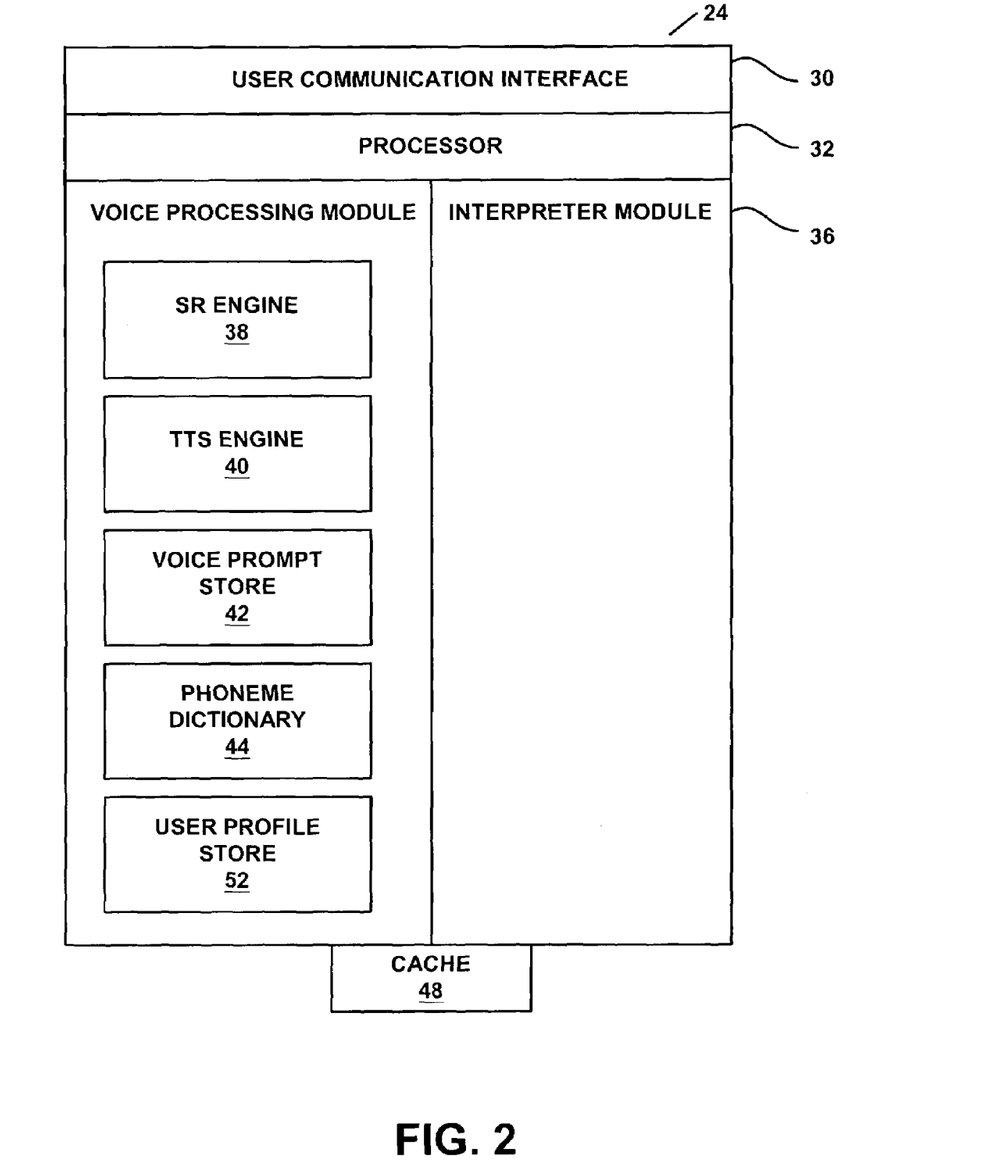
FIG. 2 is a functional block diagram illustrating a system layer of a voice command platform.

FIG. 2 is a functional block diagram illustrating a system layer 24 of the voice command platform 14.

The system layer 24 includes a user communication interface 30, a processor 32 (i.e., one or more processors), a voice-processing module 34, and an interpreter module 36. The user communication interface 30 may take various forms. For example, the user communication interface 30 can provide a circuit or packet interface with the network 20. The user communication interface 30 may, in turn, include an A-D and D-A converter, for converting between analog signals on a user side and digital signals on the voice command platform 14.

Interpreter module 36 and voice-processing module 34 define computer instructions executable by the processor 32 to carry out basic voice platform functions. The computer instructions can be stored in suitable data storage, such as ROM or a disk drive, for example, but other arrangements are also possible.

The interpreter module 36 may execute the logic that the application server 18 sends to the voice command platform 14. Typically, the interpreter 26 may interpret tag-based languages such as VXML, Speech ML, VoxML, or SALT. The interpreter 26, however, may interpret other types of languages. Alternatively, the voice command platform 14 might not be browser-based at all. In that event, the logic that is exchanged between the application server 18 and the voice command platform 14 might not take the form of documents, for example, but rather take the form of some other type of data structure.

The voice-processing module 24 preferably defines an SR engine 38, a TTS engine 40, and a voice prompt store 42. Further, voice-processing module 34 may include a phoneme dictionary 44. The processor 32 can reference the phoneme dictionary 44 to facilitate operation of the SR engine 38 and the TTS engine 40.

The voice command platform may also include a user profile store 52. The user profile store 52 may include information that the platform can use to personalize voice command services. The information defined by the user profile store 52 can be maintained in a relational database or in any other manner desired (whether as one module or separate objects, such as a meta-directory for instance), and it can be co-located with the rest of the platform or can be located elsewhere.

For example, the user profile store 52 may have ANI information, such as a billing number or telephone number, for uniquely identifying the user. Additionally, as described below, the user profile store 52 may store information relating to whether the user was engaged in a voice command session when a system disconnect occurred.

The system layer 24 of the voice command platform additionally has cache 48. The cache 48 functions to temporarily hold the logic of a voice command application (e.g., one or more documents of the voice command application) while the processor 22 is executing the logic. The processor 22 may execute the logic, using the interpreter module 36 to interpret tags. Additionally, TTS engine 38 and voice prompt store 40 may allow the voice command platform to speak to a user and SR engine 36 may recognize speech spoken by a user.

Figure 3:
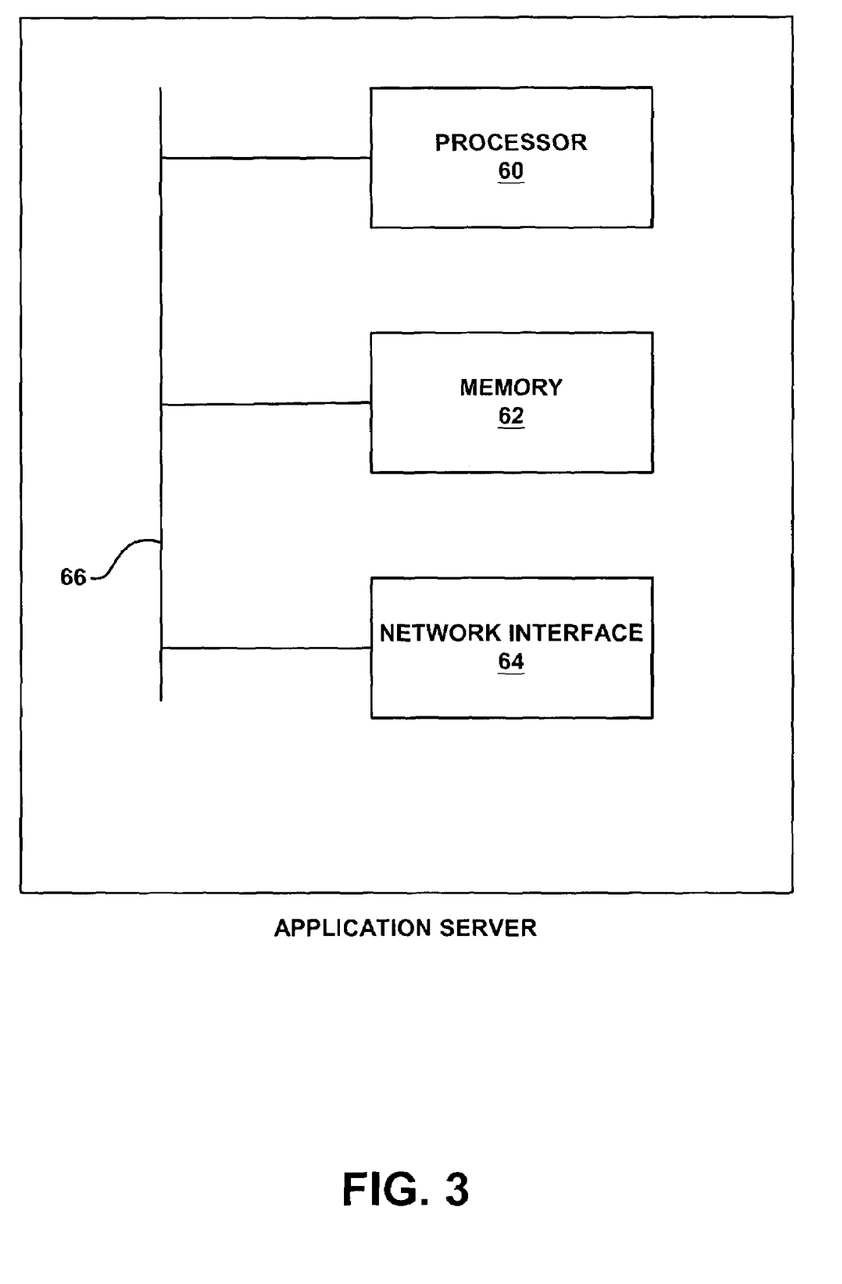
FIG. 3 is a functional block diagram illustrating an exemplary voice command application server.

FIG. 3 illustrates an exemplary architecture of the application server 18. The application server 18 may have network interface 64, a processor 60, and memory 62, coupled together by a bus 66. The network interface 64 may allow the application server 18 to communicate with the voice command platform 14 over the network 16. For example, the network interface 64 can provide a circuit or packet interface with the network 16. Additionally, the network interface 64 may allow the application server 18 to retrieve the logic of a voice command application stored in the storage device 22.

The processor 60 may execute computer instructions stored in the memory 62. The memory 62 may be RAM, ROM, or some other type of storage medium. The computer instructions stored by the memory 62 and executed by the processor 60 may facilitate serving the logic of the voice command application to the voice command platform 14.

For example, when a user calls the voice command platform 14, the voice command platform 14 may signal the application server 18 to load a voice command application from the storage medium 22. The processor 60 may receive the signal and execute computer instructions to load the voice command application into the memory 62. Additionally, the application server 18 may send logic of the application to the voice command platform 14. The logic may take the form of parts of the voice command application, for example, VXML documents that define the voice command application. Further, a response from the user may result in the voice command platform 14 sending another signal to the application server 18. In response to this signal, the processor 50 may execute computer instructions for sending the additional logic to the voice command platform 14. Again, the voice command platform 14 may execute the logic.

Figure 4:
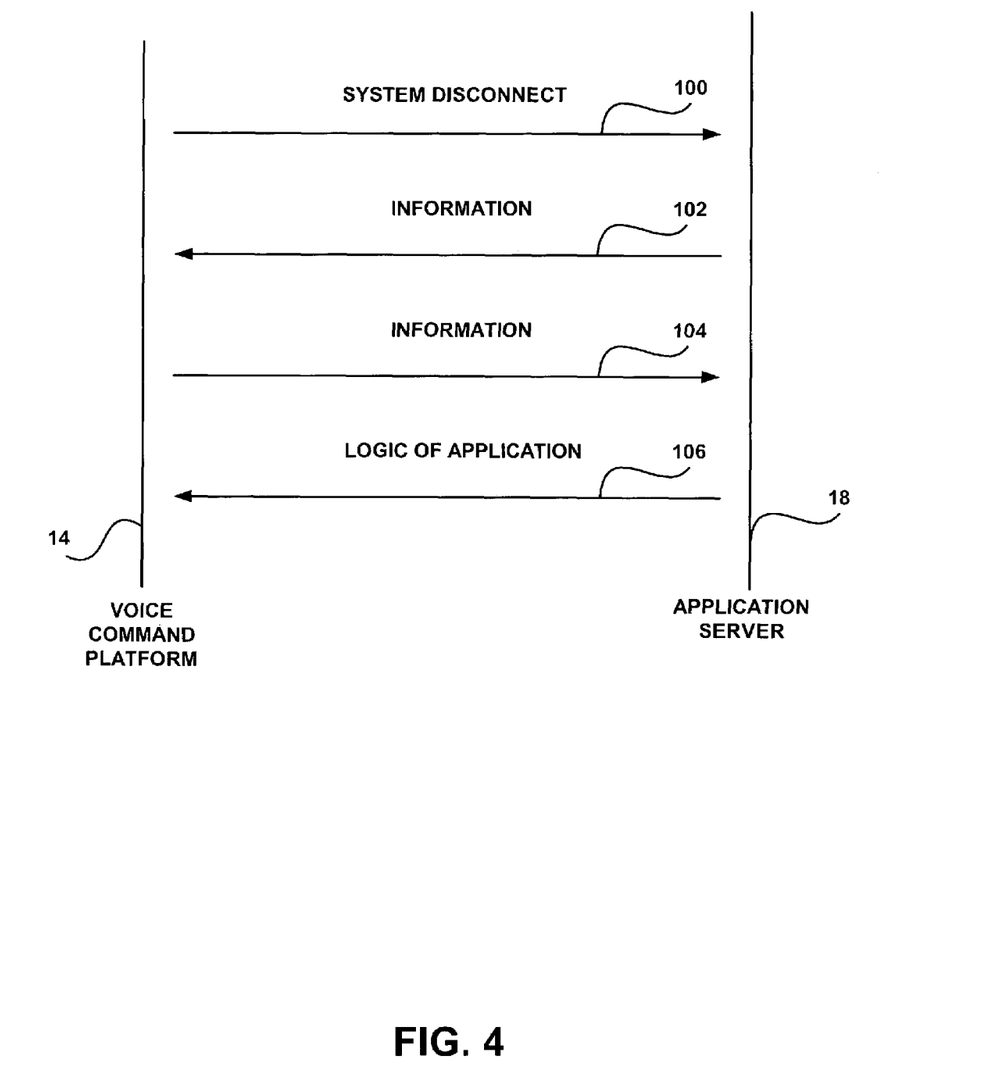
FIG. 4 illustrates communication between the voice command platform and the application server as a result of a user being disconnected from the voice command platform.

FIG. 4 illustrates communication between the voice command platform 14 and the application server 18 in the event of a user being disconnected from the voice command platform 14. The voice command platform 14 and the application server 18 may exchange one or more signals so as to facilitate restoration of the voice command session with the user when the user is reconnected back to the network 20.

The user may be engaged in a voice command session with the voice command platform 14. At some point during the voice command session, the voice command platform 14 may detect that client terminal 12 was disconnected from the voice command platform 14. The client terminal 12 may be disconnected, for instance, if the connection to the voice command platform 14 over the network 20 is cut off (e.g., as a result of a coverage drop, signal fade, hang-up, in-bound call, or out-dialed call), if the system encounters an error that causes the connection to be dropped, or in other instances. The voice command platform 14 might detect that the client terminal 12 was disconnected if a response to a prompt is not received for a predetermined period of time. At step 100, the voice command platform 14 may send a system disconnect signal to the application server 18. The system disconnect signal may indicate to the application server 18 that the client terminal 12 has been disconnected from the network 20.

When the application server 18 receives the system disconnect signal, the application server 18 may establish information to allow the voice command platform 14 to restore the voice command session with the user, when the user is reconnected back to the voice command platform 14. The information may be, for example, indicative of logic executable by the voice command platform 14 when the user is reconnected back to the voice command platform after the system disconnect. Other arrangements are also possible.

In response to receiving the system disconnect signal, at step 102, the application server 18 may send the information to the voice command platform 14. The voice command platform 14 may receive the information and store the information in the user profile store 52 or some other type of storage medium.

The voice command platform 14 may obtain, in a variety of other ways, the information that allows the voice command platform to restore a voice command session with the user. As part of a voice command session, the application server 18 may serve to the voice command platform 14 logic of a voice command application. The logic of the voice command application may define the prompts spoken to the user and the acceptable responses received from the user. The application server 18 may also embed, e.g., encode, in the logic of the voice command application, the information. The application server 18 may embed the information in the logic of the voice command application in anticipation of a system disconnect occurring during the voice command session. If a system disconnect does occur during the voice command session, then the voice command platform 14 might not have to signal the application server 18, at step 100, that the system disconnect occurred. Rather, the voice command platform 14, upon detecting a system disconnect, may extract, e.g., decode, the information from the logic of the voice command application already served to the voice command platform 14. The voice command platform 14 may then store the information in the user profile store 52. Other arrangements are also possible consistent with the exemplary embodiments of the present invention.

The user may later reconnect back to the voice command platform 14. Using the ANI or billing number for uniquely identifying the user, for instance, the voice command platform 14 may access the user profile store 52 and determine whether the user was disconnected from the voice command platform 14.

If the user was disconnected from the voice command platform 14 for more than a predetermined period of time, e.g., 15 minutes, then the voice command platform 14 and application server 14 may purge its user profile store 52 and/or its memory 62, respectively, of the information received from the application server 18 at the system disconnect. There may be no indication in the user profile store 52 that the user was disconnected from the telecommunication network. And the voice command platform 14 might not be able to restore the voice command session with the user.

If, however, the user reconnects back to the voice command platform 14 within the predetermined period of time after the system disconnect, then the user's profile store 52 may still have the information. The presence of the information may indicate to the voice command platform 14 that the user was disconnected from the voice command platform 14. If the user profile store 52 has the information received from the application server 18 at the system disconnect, then at step 104, the processor 22 may send back to the application server 18, the information stored in the user profile store 52.

The information established by the application server 14 and stored in the user profile store 52 by the voice command platform 14 may take a variety of forms. The information may be an encrypted code that the application server 18 can decrypt to determine the logic to be sent to the voice command platform 14. Alternatively, the information may identify the URI of the document to send to the voice command platform 14 upon the voice command session with the user being re-established. The application server 18 may determine the logic to send by using the encrypted code or the URI. For example, the application server 18 may maintain a table (for each user) of the information sent to the voice command platform 14 at the system disconnect and associated logic executable by the voice command platform 14 when the user is reconnected back to the voice command platform 14. When the information is sent back by the voice command application, the application server 18 may access the table and, at step 106, send the logic associated with the information to the voice command platform 14. The application server 18 may send the logic by, for example, sending a VXML document. Alternatively, if the voice command platform 14 already has a VXML document that defines the logic associated with the information, then the application server 18 may send a URI indicative of the VXML document already on the voice command platform 14. The voice command platform 14 may load the logic, e.g., a VXML document, into the cache 28, and execute the logic. As a result, the voice command platform 14 may present prompts and accept responses from the user, resulting in a restoration of the voice command session with the user.

The exemplary embodiment described above illustrates the voice command platform sending the information received from the application server 18, back to the application server 18, at step 104, when the user is reconnected back to the voice command platform 14. Additionally, the exemplary embodiment described above illustrates the voice command platform 14 sending the logic executable by the voice command platform 14 to the voice command platform 14, at step 106. Such exchange of signals might be unnecessary when, for instance, the information that is sent by the application server 18 to the voice command platform is the logic executable by the voice command platform when the user is reconnected back to the voice command platform 16. When the information is the logic itself, the voice command platform 14 may simply execute the logic when the user is reconnected back to the voice command platform 16 so as to restore the voice command session with the user. The voice command platform 14 might not have to send the information back to the application server 18 at step 104, when the user is reconnected back to the voice command platform 14. Also, the application server 18 might not have to send to the voice command platform 14, the logic to execute at step 106.

Additionally, the exemplary embodiments described above assume that the voice command platform 14 responsively executes the logic served by the application server 18 when the user is reconnected back to the voice command platform 14. The voice command platform 14, however, might not responsively execute the logic. Instead, the voice command platform 14 may prompt the user as to whether he wants to continue the voice command session after being reconnected. For instance, the voice command platform 14 may speak to the user, "Do you want to resume your voice command session?" And if the user responds affirmatively, then the voice command platform 14 may then execute the logic served by the application server 18. Therefore, the voice command platform 14 may restore the voice command session with the user, additionally based on responses to prompts after the user is reconnected back to the voice command platform. Other arrangements are also possible.

Figure 5:
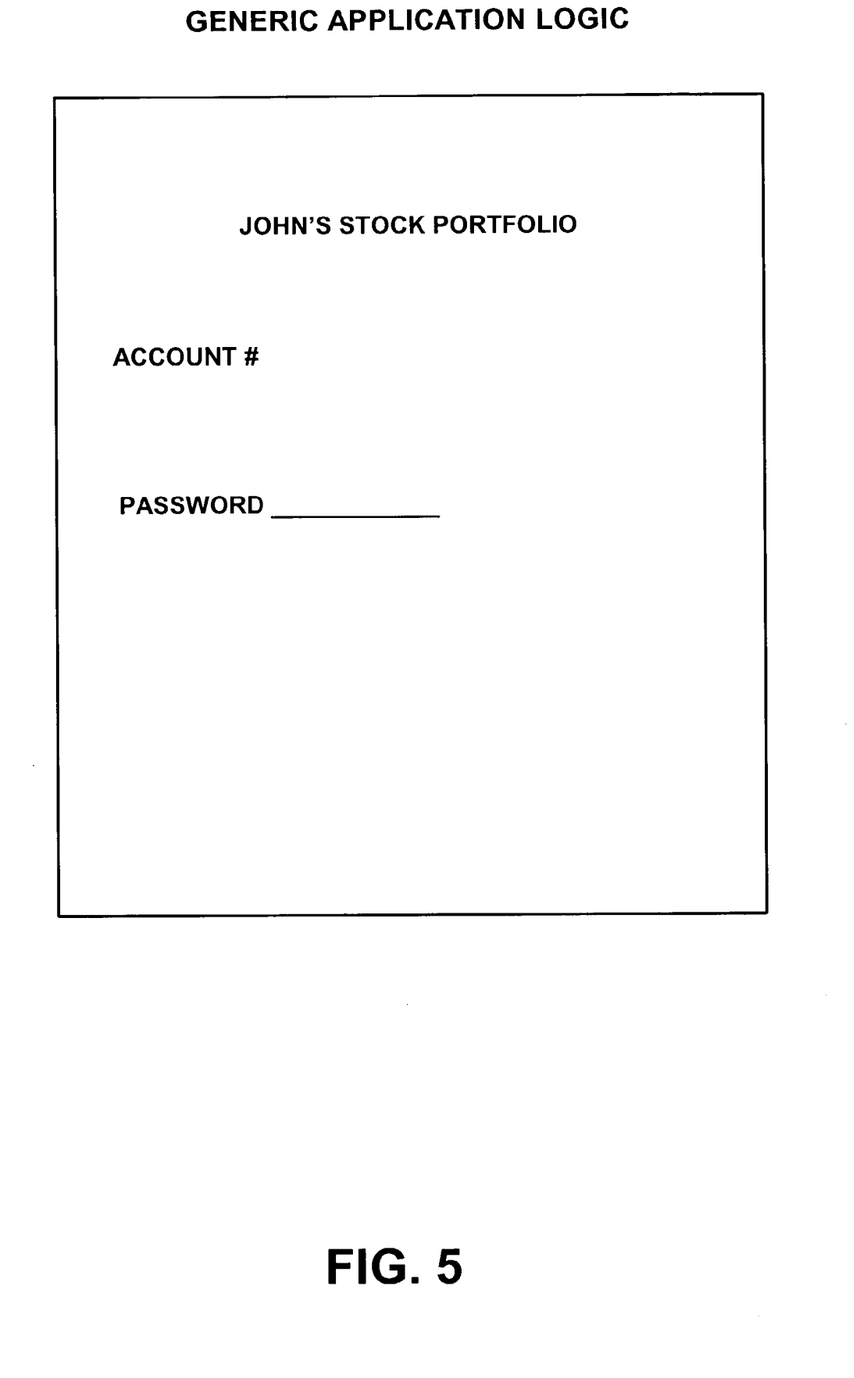
FIG. 5 illustrates exemplary generic application logic of a voice command application.
Figure 6:
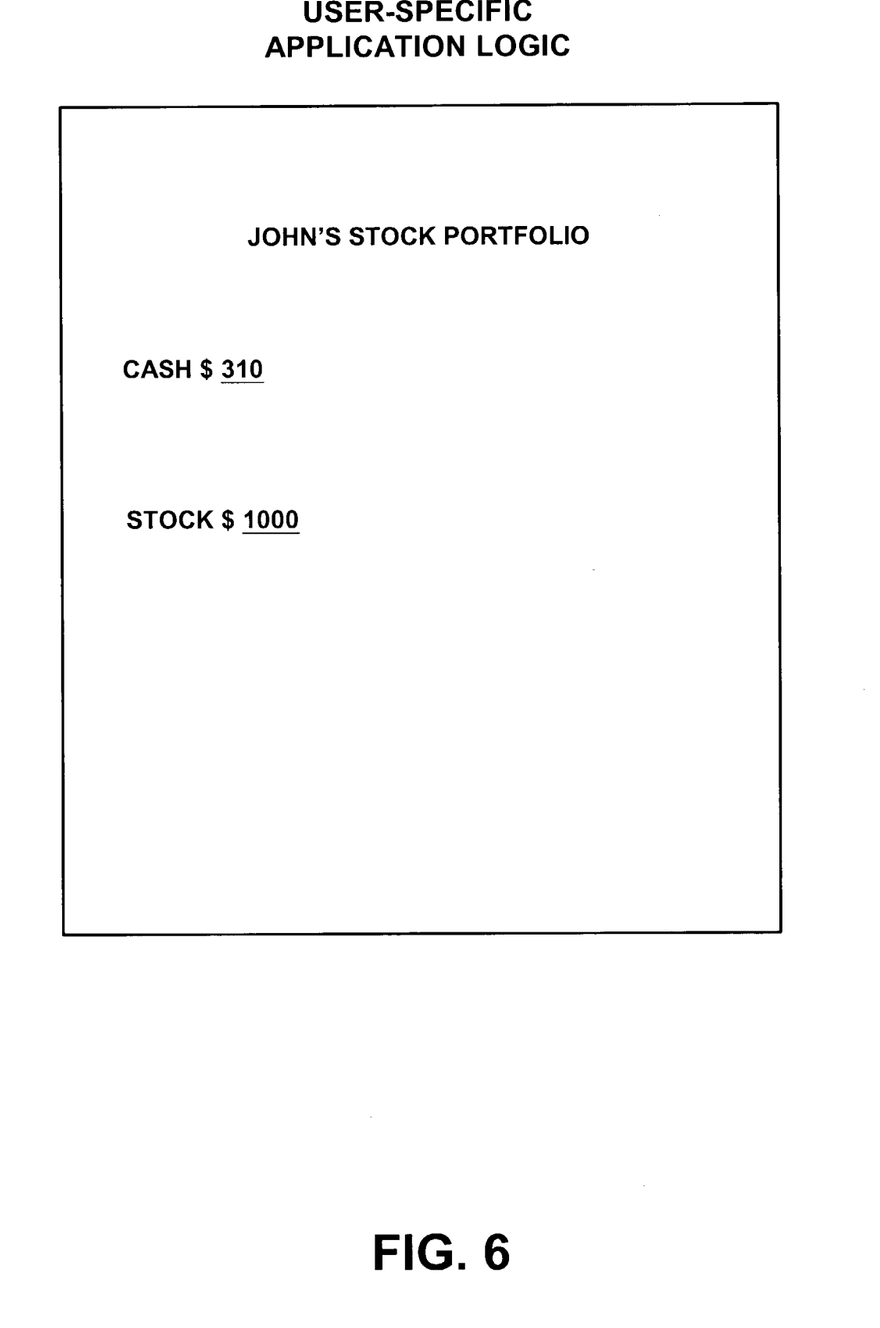
FIG. 6 illustrates exemplary user-specific application logic of a voice command application.

Type of Logic Executed When the Voice Command Session is Restored FIGS. 5 and 6 illustrate two exemplary forms of logic that the application server 18 may establish as the logic executable by the voice command platform 14 when communication with the user is restored after the system disconnect. The logic may take the form of generic application logic to be presented to any user of the voice command application. As shown by FIG. 5, for example, the logic may define a login prompt, having an account number and/or password, or some other mechanism for obtaining personal information of the user to verify his identity. Alternatively, the logic may take the form of user-specific application logic. For example, the user-specific application logic might define a navigation point of the voice command application when the system disconnect occurred or some other navigation point of the voice command application. As shown by FIG. 6, for example, the logic may be the value of the particular user's stock portfolio that would have been presented to the user, but for the system disconnect. The generic application logic and the user-specific application logic may take a variety of other forms in addition to that described herein.

The application server 18 may send to the voice command platform 14 user-specific application logic when the user is reconnected back to the voice command platform 14. Preferably, however, the logic that is sent by the application server 18 to the voice command platform 14 when the user is reconnected back to the voice command platform 14 is the generic application logic. By sending the generic application logic, rather than the user-specific application logic, there is less of a chance that confidential information will be disclosed to a user not authorized to view the confidential information.

For example, the voice command application may allow a user to access confidential information of the voice command application after the user is authorized access to the confidential information. Safe business practices may require that the user provide an account number and password to access his stock portfolio before providing the user with the value of his stock portfolio. If the user is disconnected from the network 16 after being authorized to access the value of his stock portfolio, but before the application server 18 serves the logic that identifies the value of his stock portfolio, then the application server 18 could establish as the logic executable when the user is reconnected back to the voice command platform, user-specific application logic. For instance, the user-specific application logic, in this example, may be the value of the user's stock portfolio. Such a practice, however, might jeopardize the confidential information maintained by the voice command platform 14. The user might no longer be authorized to access the confidential information when the user is reconnected back to the voice command platform 14.

Therefore, instead of serving the user-specific application logic, the application server might preferably serve generic application logic to the voice command platform 14. For example, the generic application logic may be an account number and password prompt or some or some other mechanism for verifying identity of the user. The voice command application may be configured to instruct the application server 18 to serve the logic to the voice command platform 14 when the user is reconnected back to the voice command platform 14.

Consequently, the application server 18 maintains control over what information is presented to the user when the voice command session is restored.

The application server 18 may still serve the user-specific application logic to the voice command platform 14. For instance, the voice command platform 14 may execute the generic application logic so as to prompt the user for an account number and password. Responsively, the user may speak an account number and password to the voice command platform 14. The voice command platform 14 and/or the application server 18 may determine whether the password is correct. If the password is correct, then the application server 18 may then serve to the voice command platform 14, the user-specific application logic. And the voice command platform 14 may execute the user-specific application logic. Other arrangements are also possible, consistent with the exemplary embodiments of the present invention.

Also, there may be other situations that may justify the application server 18 first serving generic application logic, rather than user-specific application logic, to the voice command platform 14 when the user is reconnected back to the voice command platform. The above example describes serving the generic application logic when the voice command application is a banking application. The application server 18 may serve the generic application logic when the voice command application provides access to, for example, a user's frequent flier mileage account, e-mail account, telephone bill account, or retirement fund. These types of applications, and others, may maintain confidential information of the user. The identity of the user should be verified before allowing access to the confidential information. The exemplary embodiment of the present invention is, in no way, limited to the situations when the application server 18 may serve generic application logic to the voice command platform 14, rather than user-specific application logic when the user is reconnected back to the voice command platform. Additionally, the exemplary embodiment of the present invention is, in no way, limited to the form of the generic application logic.

An Example of Restoring a Voice Command Session with a User

The following is specific example of how the voice command session with the user could be restored, in accordance with the exemplary embodiment of the present invention. The specific example in no way limits the exemplary embodiments of the present invention.

A user may be navigating through a set of driving directions during a voice command session with the voice command platform 14. The voice command platform 14 may present the driving directions as separate VXML documents corresponding to each step of the driving directions. When the user navigates to step 5 of the driving directions, a system disconnect might occur. For instance, the user might intentionally disconnect only to return later to get later steps of the directions. Alternatively, the user might unintentionally disconnect because the user entered into an area not covered by the network 20.

The processor 22 may send a signal indicative of the system disconnect to the application server 18. Responsively, the application server 18 may send information to allow the voice command platform 14 to restore the voice command session with the user, when the user is reconnected back to the voice command platform 14. The information may be, for example, indicative of logic executable by the voice command platform 14 when the user is reconnected back to the voice command platform.

When the user reconnects to the voice command platform 14, the voice command platform 14 may send the information back to the application server 18. The application server 18 may use the information to identify the logic executable by the voice command platform 14. Then, the application server 18 may send the logic to the voice command platform 14. The logic that the application server 18 serves to the voice command platform 14 may be user-specific application logic or generic application logic. If the logic is user-specific application logic, then the voice command platform 14 may execute the logic to result in step 5 of the driving directions being presented to the user. Thus, the voice command session may be restored to the navigational point of the voice command application when the system disconnect occurred. Alternatively, if the logic is generic application logic, then the voice command platform 14 may execute the logic to result in a password prompt being presented to the user to access the driving application. And if the user speaks a correct password, then the application server 18 may then send the user-specific application logic to result in step 5 of the driving directions being presented to the user.

Exemplary embodiments of the present invention have been described above. Those skilled in the art will understand, however, that changes and modifications may be made to these embodiments without departing from the true scope and spirit of the invention, which is defined by the claims.

What is claimed is:

1. A system for facilitating restoration of voice command sessions, the system comprising:
    an application server;
    a voice command platform arranged (i) to receive from the application server logic of a voice command application; (ii) to engage in a voice command session with a user pursuant to the voice command application; (iii) to detect a system disconnect during the voice command session; and (iv) to responsively send to the application server a signal indicative of the system disconnect;
    the application server being arranged to send to the voice command platform, in response to receiving the signal indicative of the system disconnect, information indicative of logic executable by the voice command platform when communication with the user is restored after the system disconnect; and
    the voice command platform being further arranged to send the information back to the application server, when the communication with the user is restored after the system disconnect, in order to direct the application server to send to the voice command platform the logic executable by the voice command platform, so as to restore the voice command session with the user.

2. The system of claim 1, wherein the logic executable by the voice command platform defines user prompts spoken to the user and allowed grammars to be spoken by the user when the communication with the user is restored.

3. The system of claim 1, wherein the logic executable by the voice command platform is a VXML document.

4. The system of claim 1, wherein the information indicative of the logic executable by the voice command platform is a code indicative to the application server of the logic executable by the voice command platform.

5. The system of claim 1, wherein the voice command platform is further arranged to store, in a user profile store, the information indicative of the logic executable by the voice command platform and to retrieve, from the user profile store the information when the communication with the user is restored.

6. The system of claim 1, wherein the logic executable by the voice command platform is selected from the group consisting of generic application logic of the voice command application and user-specific application logic of the voice command platform.

7. The system of claim 1, wherein the logic executable by the voice command platform facilitates verifying an identity of the user.

8. A system for facilitating restoration of voice command sessions, the system comprising:
    an application server;
    a voice command platform arranged (i) to receive from the application server logic of a voice command application; (ii) to engage in a voice command session with a user pursuant to the voice command application; and (iii) to detect a system disconnect during the voice command session;
    the application server being arranged to send to the voice command platform, embedded in the logic of the voice command application, information indicative of logic executable by the voice command platform, the logic executable by the voice command platform when communication with the user is restored after the system disconnect;
    the voice command platform being further arranged to (i) extract the information from the logic of the voice command application in response to detecting the system disconnect; (ii) to send the information back to the application server, when the communication with the user is restored after the system disconnect; and the application server being further arranged to send to the voice command platform in response to receiving the information back from the voice command platform, the logic executable by the voice command platform, so as to cause the voice command platform to restore the voice command session with the user.

9. The system of claim 8, wherein the logic executable by the voice command platform defines user prompts spoken to the user and allowed grammars to be spoken by the user when the voice command session with the user is restored.

10. The system of claim 8, wherein the logic executable by the voice command platform is a VXML, document.

11. The system of claim 8, wherein the information indicative of the logic executable by the voice command platform is a code indicative to the application server of the logic executable by the voice command platform.

12. The system of claim 8, wherein the voice command platform is further arranged to store, in a user profile store, the information indicative of the logic executable by the voice command platform and to retrieve, from the user profile store the information when the communication with the user is restored.

13. The system of claim 8, wherein the logic executable by the voice command platform is selected from the group consisting of generic application logic of the voice command application and user-specific application logic of the voice command platform.

14. The system of claim 8, wherein the logic executable by the voice command platform facilitates verifying an identity of the user.

15. A method for facilitating restoration of a voice command session with a user, the method comprising:

receiving from a voice command platform a signal indicative of a system disconnect during the voice command session;

sending to the voice command platform, in response to the signal indicative of the system disconnect, information indicative of logic executable by the voice command platform, the logic executable by the voice command platform when communication with the user is restored after the system disconnect;

receiving back from the voice command platform the information, when communication with the user is restored after the system disconnect;

determining, from the information, the logic executable by the voice command platform; and sending to the voice command platform the logic executable by the voice command platform so that the voice command platform can restore the voice command session with the user.

16. The method of claim 15, wherein a voice command application defines the logic executable by the voice command;

wherein the voice command application comprises a navigation point indicative of the logic executable by the voice command platform; and wherein sending to the voice command platform the information indicative of the logic executable by the voice command platform comprises sending the navigation point.

17. The method of claim 16, wherein the logic executable by the voice command is a VXML document, the VXML document comprising a Universal Resource Indicator; and wherein the navigation point is the Universal Resource Indicator of the VXML document.

18. The method of claim 15, wherein sending to the voice command platform, in response to the signal, the information indicative of the logic executable by the voice command platform comprises sending a code indicative, to the application server, of the logic executable by the voice command platform.

19. The method of claim 15, wherein, in response to the application server sending to the voice command platform the information indicative of the logic executable by the voice command platform, the voice command platform stores the information in a user profile store and, in response to the communication with the user being restored, the voice command platform retrieves, from the user profile store, the information so that the voice command platform can send the information back to the application server.

20. The method of claim 15, wherein the logic executable by the voice command platform is selected from the group consisting of generic application logic of the voice command application and user-specific application logic of the voice command platform.

21. The method of claim 15, wherein sending to the voice command platform the logic executable by the voice command platform comprises sending to the voice command platform a Universal Resource Indicator of a document on the voice command platform that defines the logic executable by the voice command platform.

22. A method for facilitating restoration of a voice command session with a user, the method comprising:

sending to a voice command platform, embedded in logic of a voice command application, information indicative of logic executable by the voice command platform, the logic executable by the voice command platform when communication with the user is restored after a system disconnect;

receiving back from the voice command platform, the information;

determining, from the information, the logic executable by the voice command platform; and sending to the voice command platform the logic executable by the voice command platform so that the voice command platform can restore the voice command session with the user.

23. The method of claim 22, wherein a voice command application defines the logic executable by the voice command;

wherein the voice command application comprises a navigation point indicative of the logic executable by the voice command platform; and wherein sending to the voice command platform the information indicative of the logic executable by the voice command platform comprises sending the navigation point.

24. The method of claim 23, wherein the logic executable by the voice command is a VXML document, the VXML document comprising a Universal Resource Indicator; and wherein the navigation point is the Universal Resource Indicator of the VXML document.

25. The method of claim 22, wherein sending to the voice command platform the information, comprises sending a code indicative, to the application server, of the logic executable by the voice command platform.

26. The method of claim 22, wherein, in response to the application server sending to the voice command platform the information indicative of the logic executable by the voice command platform, the voice command platform stores the information in a user profile store and, in response to the communication with the user being restored, the voice command platform retrieves, from the user profile store, the information, so the voice command platform can send the information back to the application server.

27. The method of claim 22, wherein the logic executable by the voice command platform is selected from the group consisting of generic application logic of the voice command application and user-specific application logic of the voice command platform.

28. The method of claim 22, wherein sending to the voice command platform the logic executable by the voice command platform comprises sending to the voice command platform a Universal Resource Indicator of a document on the voice command platform that defines the logic executable by the voice command platform.

* * * * *